US012583328B2

(12) United States Patent
Yamane et al.

(10) Patent No.: US 12,583,328 B2
(45) Date of Patent: Mar. 24, 2026

(54) PRECHARGE APPARATUS

(71) Applicant: ISUZU MOTORS LIMITED,
Yokohama (JP)

(72) Inventors: Futoshi Yamane, Fujisawa (JP);
Takuya Kikuchi, Fujisawa (JP)

(73) Assignee: ISUZU MOTORS LIMITED,
Yokohama (JP)

( * ) Notice: Subject to any disclaimer, the term of this
patent is extended or adjusted under 35
U.S.C. 154(b) by 71 days.

(21) Appl. No.: 18/647,182

(22) Filed: Apr. 26, 2024

(65) Prior Publication Data

US 2024/0359568 A1 Oct. 31, 2024

(30) Foreign Application Priority Data

Apr. 27, 2023 (JP) ................................. 2023-073522

(51) Int. Cl.
B60L 15/00 (2006.01)
H02J 7/00 (2006.01)

(52) U.S. Cl.
CPC .......... B60L 15/007 (2013.01); H02J 7/0063
(2013.01); B60L 2210/10 (2013.01); **B60L
2240/547** (2013.01)

(58) Field of Classification Search
CPC ............... B60L 15/007; B60L 2210/10; B60L
2240/547; H02J 7/0063
See application file for complete search history.

(56) References Cited

U.S. PATENT DOCUMENTS

2016/0079751 A1* 3/2016 Ide ........................... B60L 3/003
307/52
2022/0297665 A1* 9/2022 Murakami ............ B60L 3/0092

FOREIGN PATENT DOCUMENTS

| JP | 2007-318849 | A | 12/2007 | |
| JP | 2017-184333 | A | 10/2017 | |
| JP | 2019205297 | A * | 11/2019 | ................ B60L 3/00 |
| JP | 2020145867 | A * | 9/2020 | ................ H02J 1/00 |
| JP | 2022-167780 | A | 11/2022 | |

* cited by examiner

*Primary Examiner* — Daniel Cavallari
*Assistant Examiner* — Duc M Pham
(74) *Attorney, Agent, or Firm* — Shih IP Law Group,
PLLC

(57) ABSTRACT

A precharge apparatus includes a first battery, an electric
circuit configured to be supplied with electric power from
the first battery, a relay configured to switch electric power
supply from the first battery to the electric circuit, a second
battery, and a control section configured to control exchange
of electric power among the relay, the second battery, and
the electric circuit, wherein the control section causes the
second battery to supply electric power to the electric circuit
while the relay is in an open state, and when a voltage level
of the electric circuit reaches a predetermined value or
higher, controls the relay to a closed state.

4 Claims, 3 Drawing Sheets

PRECHARGE APPARATUS

CROSS REFERENCE TO RELATED APPLICATIONS

The entire disclosure of Japanese patent Application No. 2023-073522 filed on Apr. 28, 2023, is incorporated herein by reference in its entirety.

TECHNICAL FIELD

The present disclosure relates to precharge apparatuses.

BACKGROUND ART

In electric vehicles (EVs) equipped with a driving battery, the electric circuit is powered by the battery via a power supply line. By disposing a main relay on the power supply line and switching the main relay from the open state to the closed state, the electric circuit is powered by the battery.

When the electric circuit is powered by the battery, with the voltage of the electric circuit low relative to the voltage of the battery, the electric circuit may break down due to a high current. For this reason, it is necessary to increase the voltage of the electric circuit relative to the battery voltage, and after the difference between the battery voltage and the voltage of the electric circuit falls within a predetermined range, to switch the main relay to the closed state.

For example, Japanese Patent Application Laid-Open No. 2022-167780 discloses a precharge relay circuit for stepping up the electric circuit based on the battery voltage.

EVs are equipped with a control battery for supplying electric power to the components of their control system. One example of the control battery is a lead-acid battery.

In EVs, the control battery (lead-acid battery) is powered by the driving battery. Thus, the lead-acid battery is charged. In charging the lead-acid battery, when the voltage of the driving battery is higher than the voltage of the lead-acid battery, the voltage of the driving battery is decreased to the same as the voltage of the lead-acid battery by a direct-current to direct-current (DC-to-DC) converter, and then the electric power of the driving battery is supplied to the lead-acid battery.

SUMMARY OF INVENTION

The present disclosure provides a precharge apparatus capable of bypassing the main relay.

In order to achieve the above objects, a precharge apparatus according to the present disclosure includes: a first battery; an electric circuit configured to be supplied with electric power from the first battery; a relay configured to switch electric power supply from the first battery to the electric circuit; a second battery; and a control section configured to control exchange of the electric power among the relay, the second battery, and the electric circuit, in which the control section causes the second battery to supply the electric power to the electric circuit while the relay is in an open state, and when a level of a voltage of the electric circuit reaches a target value, controls the relay to a closed state.

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention.

DESCRIPTION OF EMBODIMENTS

Hereinafter, one or more embodiments of the present invention will be described with reference to the drawings. However, the scope of the invention is not limited to the disclosed embodiments.

Embodiments of the present disclosure will be described hereinbelow with reference to the drawings.

Figure 1:
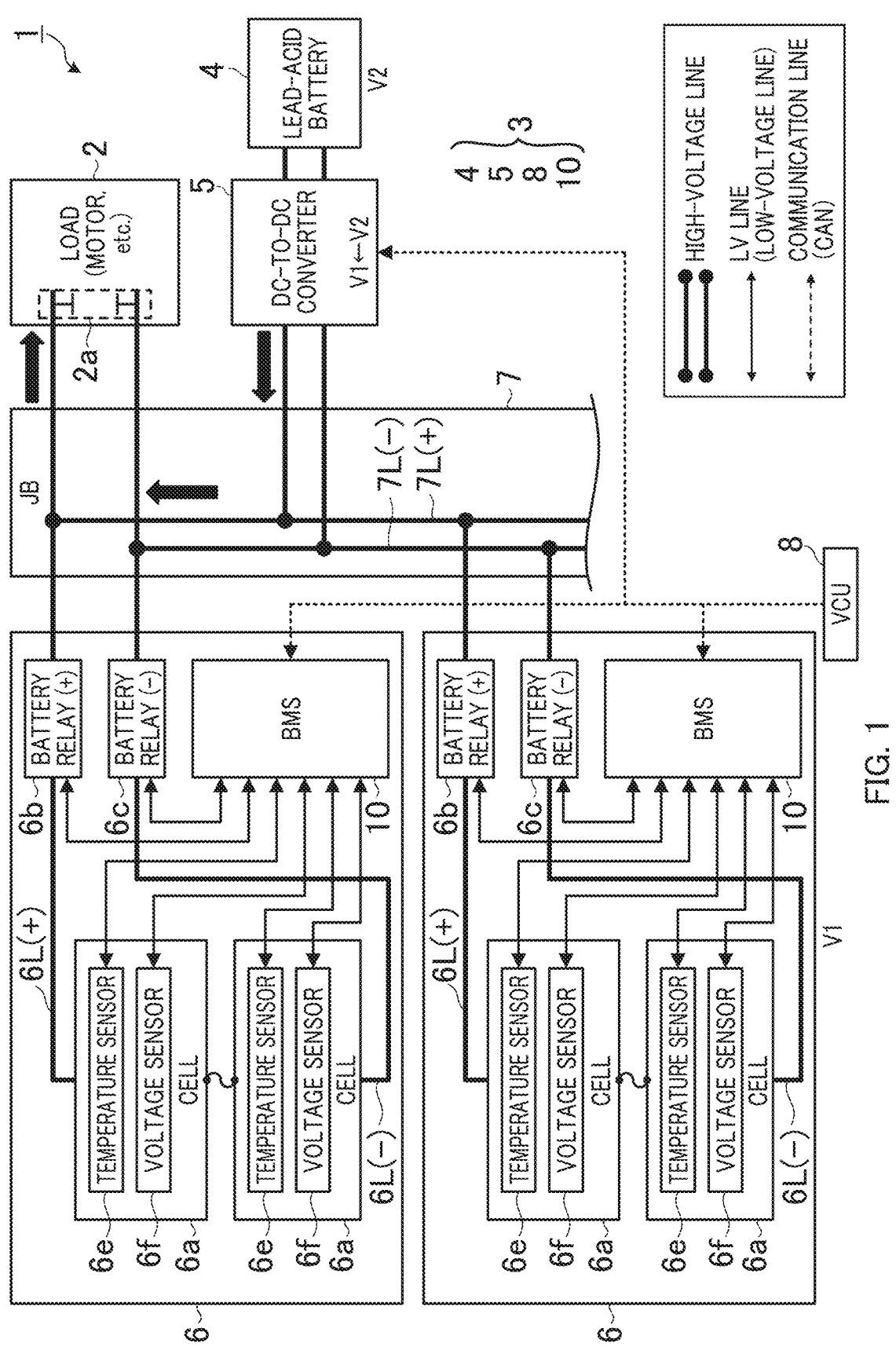
FIG. 1 is a diagram illustrating an example of an electrical power system for an electric vehicle equipped with a precharge apparatus according to an embodiment of the present disclosure.

FIG. 1 is a diagram illustrating an example of an electrical power system for an electric vehicle (EV) equipped with a precharge apparatus according to an embodiment of the present disclosure. In the following description, the present disclosure is applied to trucks, buses, and other commercial vehicles. However, this is illustrative only, and the present disclosure may be applied to passenger cars and other vehicles.

As illustrated in FIG. 1, electrical power system 1 includes external load 2, precharge apparatus 3, multiple battery packs 6, junction box (JB) 7, and vehicle control unit (VCU) 8. Precharge apparatus 3 includes lead-acid battery 4 and DC-to-DC converter 5. DC-to-DC converter 5 includes DC-to-DC control section 5a. Battery pack 6 includes battery management system (BMS) 10. Battery pack 6 corresponds to "first battery" of the present disclosure. Lead-acid battery 4 corresponds to "second battery" of the present disclosure. Junction box (JB) 7 corresponds to "electric circuit" of the present disclosure. Vehicle control unit (VCU) 8, battery management system (BMS) 10, and DC-to-DC control section 5a correspond to the "control section" of precharge apparatus 3 of the present disclosure.

(External Load 2)

External load 2 includes a motor, a heater, and accessories. External load 2 may include capacitor 2a. The motor is a drive motor that operates by being powered by battery pack 6. The heater heats battery pack 6 itself by being power by battery pack 6. The accessories are installed in the EV and operate by being powered by battery pack 6. Examples of the accessories include a pallet elevator and a refrigerator-freezer.

(Lead-Acid Battery 4)

Lead-acid battery 4 is a control battery for suppling electric power to the components of the control system (not shown) installed in the EV. Lead-acid battery 4 has predetermined voltage Vpb. Voltage Vpb ranges from 11 V to 14 V, for example. The EV may be equipped with another lead-acid battery having a voltage in the range from 22 V to 28 V, for example.

(DC-to-DC Converter 5)

In the EV, the electric power of battery pack 6 is supplied to lead-acid battery 4. Thus, lead-acid battery 4 is charged. Lead-acid battery 4 outputs a lower voltage (corresponding to the "first voltage value" of the present disclosure) than battery pack 6. The first voltage value is hereinafter referred to as "cell voltage V1". When the voltage Vpb of lead-acid battery 4 is lower than cell voltage V1 (Vpb<V1), after stepping down battery pack 6, the electric power of battery pack 6 is supplied to lead-acid battery 4 during charging. For this reason, DC-to-DC converter 5 has a step-down function for decreasing the voltage of battery pack 6.

The voltage level of the electric circuit (corresponding to "second voltage value" of the present disclosure) may be lower than the voltage level of battery pack 6. Hereinafter, the second voltage value is referred to as "voltage V2 of the electric circuit" or "relay outside voltage V2". In this case, when electric power is supplied from battery pack 6 to the electric circuit, the electric circuit may brake down due to the high current from battery pack 6. For this reason, it is necessary to raise the voltage level of the electric circuit relative to the voltage level of battery pack 6, and after the voltage level of the electric circuit reaches the target value, bring battery relay (+)6b and battery relay (–)6c into the closed state, and connect battery pack 6 and electric circuit together (relay connection request). The target value is a value corresponding to cell voltage V1. The target value may be a predetermined fixed value.

Thus, in this embodiment, DC-to-DC converter 5 has a step-up function to output a stepped-up voltage higher than the voltage Vpb of lead-acid battery 4 (input voltage). The stepped-up voltage is applied to capacitor 2a. This causes the voltage level of the electric circuit to increase to a substantially the same as the voltage value of cell voltage V1.

DC-to-DC converter 5 includes DC-to-DC control section 5a. DC-to-DC control section 5a controls DC-to-DC converter 5 so as to switch between the step-up function and the step-down function in response to a request from vehicle control unit (VCU) 8 (for example, a step-up request, a step-up stop request, a step-down request, or a step-down stop request). Specifically, DC-to-DC control section 5a controls DC-to-DC converter 5 so as to step up the voltage Vpb of lead-acid battery 4 in response to the step-up request from vehicle control unit (VCU) 8. DC-to-DC control section 5a also controls DC-to-DC converter 5 so as to stop step-up of the voltage Vpb of lead-acid battery 4 in response to the step-up stop request from vehicle control unit (VCU) 8.

(Battery Pack 6)

Since multiple battery packs 6 have the same configuration, one of battery packs 6 will be described as a representative. Battery pack 6 includes multiple cells 6a, battery relay (+)6b, battery relay (–)6c, and battery management system (BMS) 10.

One terminal of battery relay (+)6b is connected to the plus terminal of each cell 6a via high-voltage line 6L(+). The other terminal of battery relay (+)6b is connected to high-voltage line 7L(+). One terminal of battery relay (–)6c is connected to the minus terminal of each cell 6a via high-voltage line 6L(–). The other terminal of battery relay (–)6c is connected to high-voltage line 7L(–).

Each cell 6a includes temperature sensor 6e and voltage sensor 6f. Temperature sensor 6e detects the cell temperature. Temperature sensor 6e outputs the detection result (cell temperature) to battery management system (BMS) 10. Voltage sensor 6f detects cell voltage V1. Voltage sensor 6f outputs cell voltage V1 to battery management system 10. A voltage sensor (not shown) detects the voltage V2 of the electric circuit. The voltage sensor outputs the voltage V2 of the electric circuit to battery management system 10.

(Junction Box 7)

Junction box (JB) 7 constitutes the electric circuit. Junction box (JB) 7 is disposed between battery pack 6 and external load 2. JB 7 includes high-voltage line 7L(+) and high-voltage line 7L(–). High-voltage line 7L(+) and high-voltage line 7L(–) are individually connected to lead-acid battery 4 via DC-to-DC converter 5.

Figure 2:
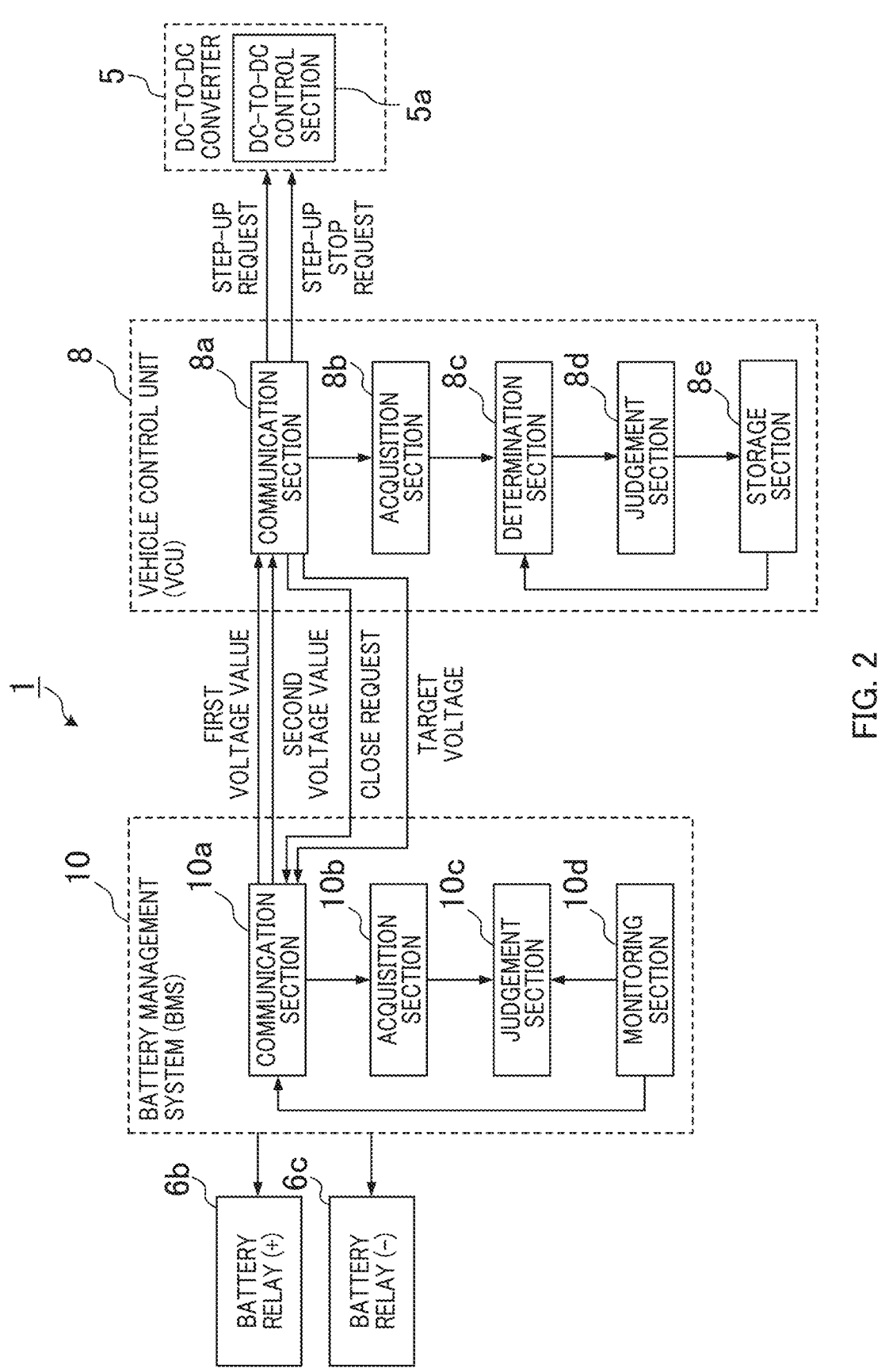
FIG. 2 is a functional diagram of an example of the precharge apparatus of this embodiment.

Next, a specific example of precharge apparatus 3 will be described with reference to FIG. 2. FIG. 2 is a functional diagram of an example of precharge apparatus 3.

(Battery Management System 10)

Battery management system (BMS) 10 controls battery relay (+)6b so as to connect/disconnect high-voltage line 6L(+) and high-voltage line 7L(+) and controls battery relay (–)6c so as to connect/disconnect high-voltage line 6L(–) and high-voltage line 7L(–) based on the input cell temperature and cell voltage V1.

For example, battery management system (BMS) 10 calculates the state of charge (SOC) with reference to a curve representing the relationship between SOC and the open circuit voltage (OCV) of battery pack 6, set for each temperature, based on OCV and the cell temperature.

Battery management system (BMS) 10 is a processor, such as a central processing unit (CPU) or a graphics processing unit (GPU), and functions as communication section 10a, acquisition section 10b, judgement section 10c, and monitoring section 10d by executing a program stored in a storage section (for example, an internal memory). In FIG. 2, the arrows indicate main data flows. Data flows that are not illustrated in FIG. 2 are acceptable. In FIG. 2, the functional blocks are not in units of hardware (apparatus) but in units of function. For this reason, the functional blocks illustrated in FIG. 2 may be installed in a single apparatus or may be separately installed in multiple apparatuses. Exchange of data between the functional blocks may be performed via a data bus, a controller area network (CAN) bus, or any other means.

(Communication Section 10a)

Communication section 10a is connected to communication section 8a of vehicle control unit (VCU) 8 via a communication line (CAN bus). Communication section 10a transmits a voltage value, a cell temperature, and SOC obtained by acquisition section 10b to vehicle control unit (VCU) 8. Specifically, communication section 10a transmits the cell temperature and cell voltage V1 to vehicle control unit (VCU) 8. Communication section 10a also transmits the voltage V2 of the electric circuit to vehicle control unit (VCU) 8. Communication section 10a receives a relay connection request and the target value from vehicle control unit (VCU) 8.

(Acquisition Section 10b)

Acquisition section 10b acquires the state of battery pack 6, for example, cell voltage V1, the voltage V2 of the electric circuit, the cell temperature, and SOC, at fixed time intervals. Acquisition section 10b obtains the target value received by communication section 10a.

(Judgement Section 10c)

When a relay connection request is sent from vehicle control unit (VCU) 8, judgement section 10c determines whether the voltage V2 of the electric circuit falls within a predetermined range from the target value. The voltage V2 of the electric circuit is checked twice by vehicle control unit (VCU) 8 and battery management system (BMS) 10, which allows self-protection. When it is determined that the voltage V2 of the electric circuit is within the predetermined range from the target value, battery management system (BMS) 10 outputs a relay-connection completion notification to vehicle control unit (VCU) 8.

(Monitoring Section 10d)

Monitoring section 10d monitors the state of battery pack 6 (cell temperature, cell voltage V1, the voltage V2 of the electric circuit, SOC, and so on) and performs control for using battery pack 6 safely and efficiently.

(Vehicle Control Unit 8)

Vehicle control unit (VCU) 8 determines the state of the EV and executes control for maintaining the EV in an optimum state. Specifically, when an abnormality of the EV is detected, vehicle control unit 8 controls the motor to stop the EV. Vehicle control unit 8 controls the electric power to be supplied from battery pack 6 to the motor by changing the voltage between battery pack 6 and the motor.

Vehicle control unit 8 is a processor, such as a CPU or a GPU, and functions as communication section 8a, acquisition section 8b, determination section 8c, and judgement section 8d by executing a program stored in storage section 8e. In FIG. 2, the arrows indicate main data flows. Data flows that are not illustrated in FIG. 2 are acceptable. In FIG. 2, the functional blocks are not in units of hardware (apparatus) but in units of function. For this reason, the functional blocks illustrated in FIG. 2 may be installed in a single apparatus or may be separately installed in multiple apparatuses. Exchange of data between the functional blocks may be performed via a data bus, a controller area network (CAN) bus, or any other means.

(Communication Section 8a)

Communication section 8a receives the state of the battery (the cell temperature, cell voltage V1, the voltage V2 of the electric circuit, the current value, and so on) from battery management system 10.

(Acquisition Section 8b)

Acquisition section 8b acquires cell voltage V1 and the voltage V2 of the electric circuit received by communication section 8a.

(Determination Section 8c)

Determination section 8c determines the target value based on cell voltage V1 obtained by acquisition section 8b.

(Judgement Section 8d)

Judgement section 8d judges whether the voltage V2 of the electric circuit is within a predetermined range (within ±X %) from the target value (cell voltage V1).

When the target value is determined, vehicle control unit 8 issues a step-up request (precharge request) to DC-to-DC converter 5. When it is determined that the voltage V2 of the electric circuit is a value within the predetermined range (within ±X %) from the target value (cell voltage V1), vehicle control unit 8 issues a relay connection request to battery management system (BMS) 10. When a relay-connection completion notification is given from battery management system (BMS) 10, vehicle control unit 8 issues a step-up stop request (precharge end request) to DC-to-DC converter 5.

(Storage Section 8e)

Examples of storage section 8e include a read only memory (ROM) for storing the basic input output system (BIOS) of a computer implementing vehicle control unit 8, a random access memory (RAM) serving as the work space for vehicle control unit 8, and a hard disk drive (HDD) and a solid state drive (SSD), which store an operating system (OS), an application program, and various items of information to be referred to in executing the application program.

The apparatuses constituting battery management system 10 and vehicle control unit 8 may be constituted by a single apparatus or separated apparatuses. The apparatuses may be composed of a combination of apparatuses and the other apparatus. The apparatuses constituting battery management system 10 and vehicle control unit 8 illustrated in FIG. 2 are implemented by at least one of multiple different processors executing a program. Battery management system 10 and vehicle control unit 8 may be implemented by computation resources, such as multiple processors and memories.

Figure 3:
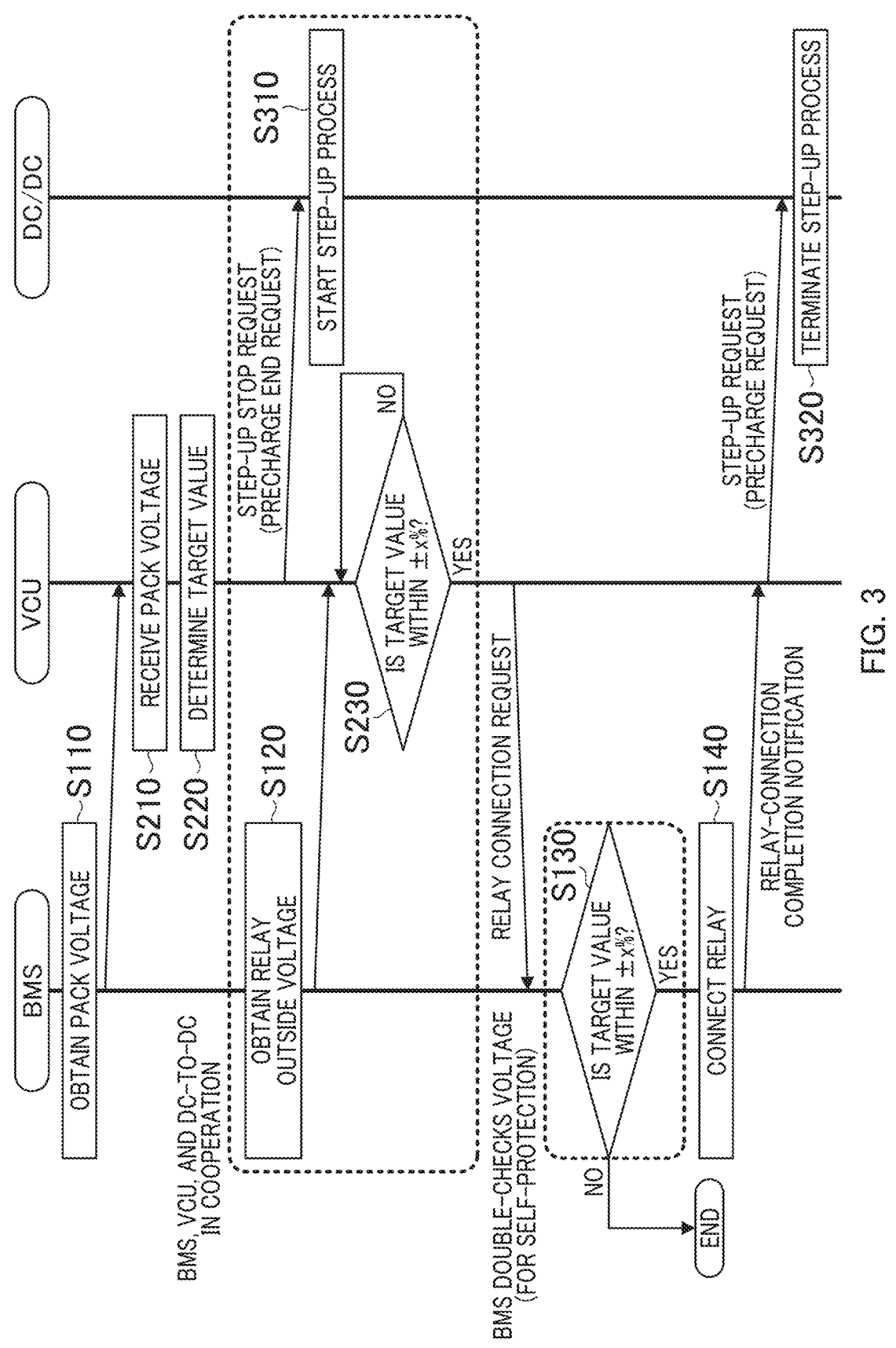
FIG. 3 is a flowchart illustrating an example of the operation of the precharge apparatus of this embodiment.

Next, one example of the operation of precharge apparatus 3 of this embodiment will be described with reference to FIG. 3. FIG. 3 is a flowchart illustrating an example of the operation of precharge apparatus 3 of this embodiment. The processing procedure illustrated in FIG. 3 is started when the electric power of battery pack 6 is used as electric power to be supplied to external load 2.

First, in step S110, battery management system (BMS) 10 obtains pack voltage V1.

Next, in step S210, vehicle control unit (VCU) 8 receives pack voltage V1.

Next, in step S220, vehicle control unit (VCU) 8 determines a target value. Vehicle control unit (VCU) 8 transmits a step-up request (precharge request) to DC-to-DC converter 5.

Next, in step S120, battery management system (BMS) 10 obtains a relay outside voltage (the voltage V2 of the electric circuit). Battery management system (BMS) 10 transmits the relay outside voltage (the voltage V2 of the electric circuit) to vehicle control unit (VCU) 8.

Next, in step S310, DC-to-DC converter 5 starts a step-up process in response to the step-up request from vehicle control unit (VCU) 8.

Next, in step S230, vehicle control unit (VCU) 8 determines whether the relay outside voltage (the voltage V2 of the electric circuit) is a value within a predetermined range (within ±X %) from the target value. When the relay outside voltage (the voltage V2 of the electric circuit) falls within the predetermined range (within ±X %) from the target value (step S230: YES), the processing goes to step S130. When the relay outside voltage (the voltage V2 of the electric circuit) is not within the predetermined range (within ±X %) from the target value (step S230: NO), the processing returns to the state before step S230.

In step S130, battery management system (BMS) 10 determines whether the relay outside voltage (the voltage V2 of the electric circuit) is a value within the predetermined range (within ±X %) from the target value. When the relay outside voltage (the voltage V2 of the electric circuit) is within the predetermined range (within ±X %) from the target value (step S130: YES), the processing goes to step S140. When the relay outside voltage (the voltage V2 of the electric circuit) is not within the predetermined range (within ±X %) from the target value (step S130: NO), this processing ends.

In step S140, battery management system (BMS) 10 connects the relay. Battery management system (BMS) 10 sends a relay-connection completion notification to vehicle control unit (VCU) 8. Vehicle control unit (VCU) 8 transmits a step-up stop request (precharge end request) to DC-to-DC converter 5 in response to the relay-connection completion notification.

In step S320, DC-to-DC converter 5 terminates the step-up process. Thereafter, this processing ends.

Precharge apparatus 3 of the above embodiment includes battery pack 6, the electric circuit powered by battery pack 6, battery relay (+)6b and battery relay (−)6c that switch the supply of electric power from battery pack 6 to the electric circuit, lead-acid battery 4, and the control section that controls the exchange of electric power between battery relay (+)6b, battery relay (−)6c, and lead-acid battery 4, and the electric circuit. While battery relay (+)6b and battery relay (−)6c are in the open state, the control section causes lead-acid battery 4 to supply electric power to the electric circuit via DC-to-DC converter 5, and when the voltage level of the electric circuit reaches the target value, the control section controls battery relay (+)6b and battery relay (−)6c to the closed state.

This configuration allows the electric circuit to be stepped up using lead-acid battery 4 and DC-to-DC converter 5, allowing the main relay to be bypassed.

In precharge apparatus 3 of the above embodiment, the target value is a value corresponding to the output voltage of battery pack 6. This allows the voltage of the electric circuit to be increased to the voltage corresponding to the output voltage of battery pack 6.

In precharge apparatus 3 of the above embodiment, lead-acid battery 4 is a battery with a lower output voltage than battery pack 6 and includes DC-to-DC converter 5 between lead-acid battery 4 and the electric circuit. This allows, even lead-acid battery 4 with a lower output voltage than battery pack 6 can increase the output of the electric circuit using DC-to-DC converter 5.

In precharge apparatus 3 of the above embodiment, the control section controls DC-to-DC converter 5 to supply electric power from lead-acid battery 4 to the electric circuit. This allows the electric power to be supplied from lead-acid battery 4 to the electric circuit to be adjusted, allowing the voltage of the electric circuit to be increased to a voltage corresponding to the output voltage of battery pack 6.

In precharge apparatus 3 of the above embodiment, the control section includes DC-to-DC control section 5a, battery management system (BMS) 10, and vehicle control unit (VCU) 8. DC-to-DC control section 5a controls DC-to-DC converter 5 so as to adjust the voltage of the electric circuit. Battery management system (BMS) 10 monitors the first voltage value, which is the value of the output voltage of battery pack 6, and the second voltage value, which is the value of the output voltage of the electric circuit, and controls the open and close of the relay. Vehicle control unit (VCU) 8 obtains the first voltage value from battery management system (BMS) 10, determines the target value based on the obtained first voltage value, and issues a step-up request to DC-to-DC control section 5a. Vehicle control unit (VCU) 8 obtains the second voltage value from battery management system (BMS) 10 and determines whether the obtained second voltage value is within a predetermined range from the target value, wherein when the vehicle control unit (VCU) 8 determines that the second voltage value is within the predetermined range from the target value, issues a relay close request to battery management system (BMS) 10 and a step-up stop request to DC-to-DC control section 5a. This causes the relay to be closed after the voltage of the electric circuit increases to the voltage corresponding to the output voltage of battery pack 6, thereby preventing the electric circuit from being broken down due to the high current from the battery pack 6. This allows the main relay disposed on the electric circuit to be bypassed.

In precharge apparatus 3 of the above embodiment, battery management system (BMS) 10 obtains the target value from vehicle control unit (VCU) 8, and when a relay close request is issued, determines whether the second voltage value is within the predetermined range from the obtained target value, wherein when the second voltage value is within the predetermined range, controls the relay to the closed state. Thus, the voltage V2 of the electric circuit is checked twice by vehicle control unit (VCU) 8 and battery management system (BMS) 10, which allows self-protection.

In precharge apparatus 3 of the above embodiment, the target value is a value corresponding to the output voltage of battery pack 6. However, this is illustrative only in the present disclosure. For example, the target value may be a predetermined fixed value. In this case, the fixed value is set through an experiment or a simulation conducted for each type of electrical power system 1.

In precharge apparatus 3 of the above embodiment, an example of the voltage Vpb of lead-acid battery 4 is a voltage in the range from 11 V to 14 V. However, this is illustrative only in the present disclosure. The voltage Vpb of lead-acid battery 4 may be a voltage in the range from 22 V to 28 V, for example. In this case, the control section executes control to step up the electric circuit using lead-acid battery 4 having a voltage in the range from 22 V to 28 V Precharge apparatus 3 may include both of lead-acid battery 4 having a voltage in the range from 11 V to 14 V and lead-acid battery 4 having a voltage in the range from 22 V to 28 V. In this case, the control section switches the batteries to execute control to step up the electric circuit.

It is to be understood that the above embodiments are mere specific examples in implementing the present disclosure and that the technical scope of the present disclosure is not interpreted as limited by the embodiments. In other words, the present disclosure can be implemented in various forms without departing from its gist or its main features.

The present disclosure is suitable for EVs equipped with an electric power supply system that requires bypassing the main relay.

The invention claimed is:

1. A precharge apparatus, comprising:
   a first battery;
   an electric circuit configured to be supplied with electric power from the first battery;
   a relay configured to switch electric power supply from the first battery to the electric circuit;
   a second battery with a lower output voltage than the first battery;
   a DC-to-DC converter placed between the second battery and the electric circuit; and
   a control section configured to control exchange of the electric power among the relay, the second battery, and the electric circuit,
   wherein the control section controls the DC-to-DC converter to supply the electric power from the second battery to the electric circuit while the relay is in an open state,
   wherein the control section includes a DC-to-DC control section, a battery management system, and a vehicle control unit,
   wherein the DC-to-DC control section controls the DC-to-DC converter to adjust the voltage of the electric circuit,
   wherein the battery management system monitors a first voltage value and a second voltage value, and controls open and close of the relay, the first voltage value being a value of an output voltage of the first battery, the second voltage value being a value of an output voltage of the electric circuit, and
   wherein the vehicle control unit obtains the first voltage value from the battery management system, determines a target value based on the obtained first voltage value, issues a step-up request to the DC-to-DC control section, obtains the second voltage value from the battery management system, determines whether the obtained second voltage value is within a predetermined range from the target value, wherein, when the vehicle control unit determines that the second voltage value is within the predetermined range from the target value, issues a relay close request to the battery management system and issues a step-up stop request to the DC-to-DC control section.

2. The precharge apparatus according to claim 1, wherein the battery management system obtains the target value from the vehicle control unit, and when the relay close request is issued, the battery management system determines whether the second voltage value is within the predetermined range from the obtained the target value, and when the second voltage value is within the predetermined range, the battery management system controls the relay to a closed state.

3. The precharge apparatus according to claim 1, wherein the second battery has a voltage ranging from 11 V to 14 V.

4. The precharge apparatus according to claim 1, wherein the second battery has a voltage ranging from 22 V to 28 V.

* * * * *